Nov. 12, 1957  F. F. DE OVIEDO  2,812,823
WIND DRIVEN POWER PLANT WITH AIR GUIDING ELEMENTS
Filed June 21, 1952  4 Sheets-Sheet 1

INVENTOR:
Fortunato Fernandez
de Oviedo
BY:

Nov. 12, 1957  F. F. DE OVIEDO  2,812,823
WIND DRIVEN POWER PLANT WITH AIR GUIDING ELEMENTS
Filed June 21, 1952  4 Sheets-Sheet 2

INVENTOR:
Fortunato Fernandez
de Oviedo
BY: Michael S. Striker
Agt.

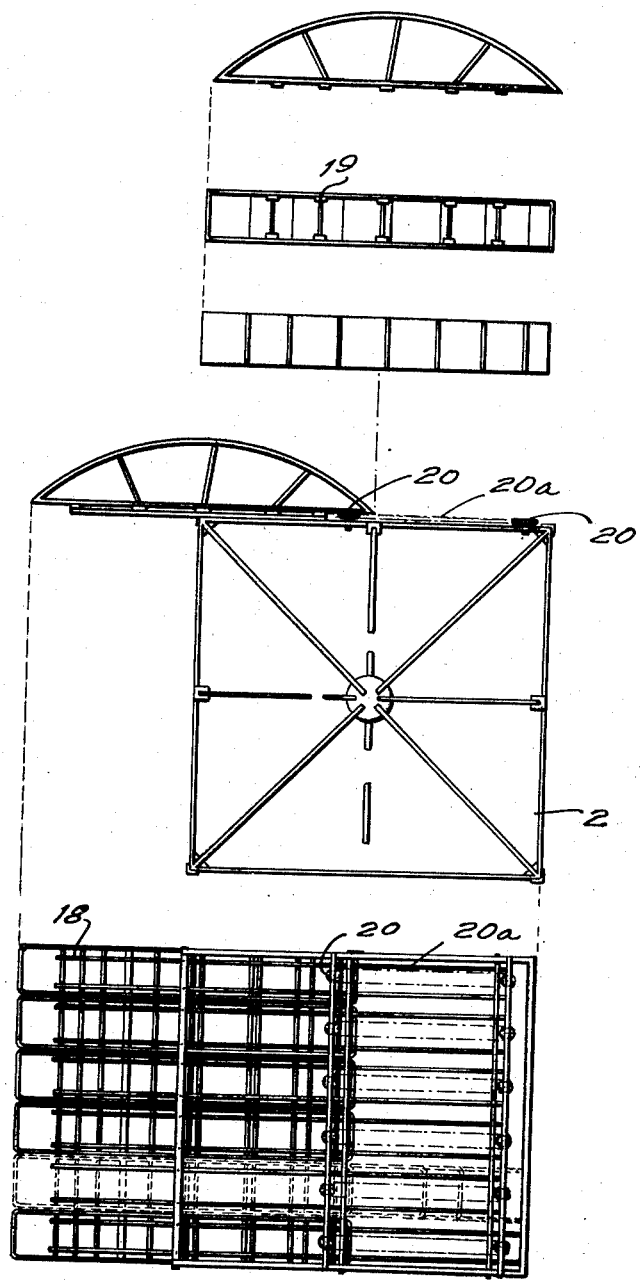

Nov. 12, 1957 — F. F. DE OVIEDO — 2,812,823
WIND DRIVEN POWER PLANT WITH AIR GUIDING ELEMENTS
Filed June 21, 1952 — 4 Sheets-Sheet 4
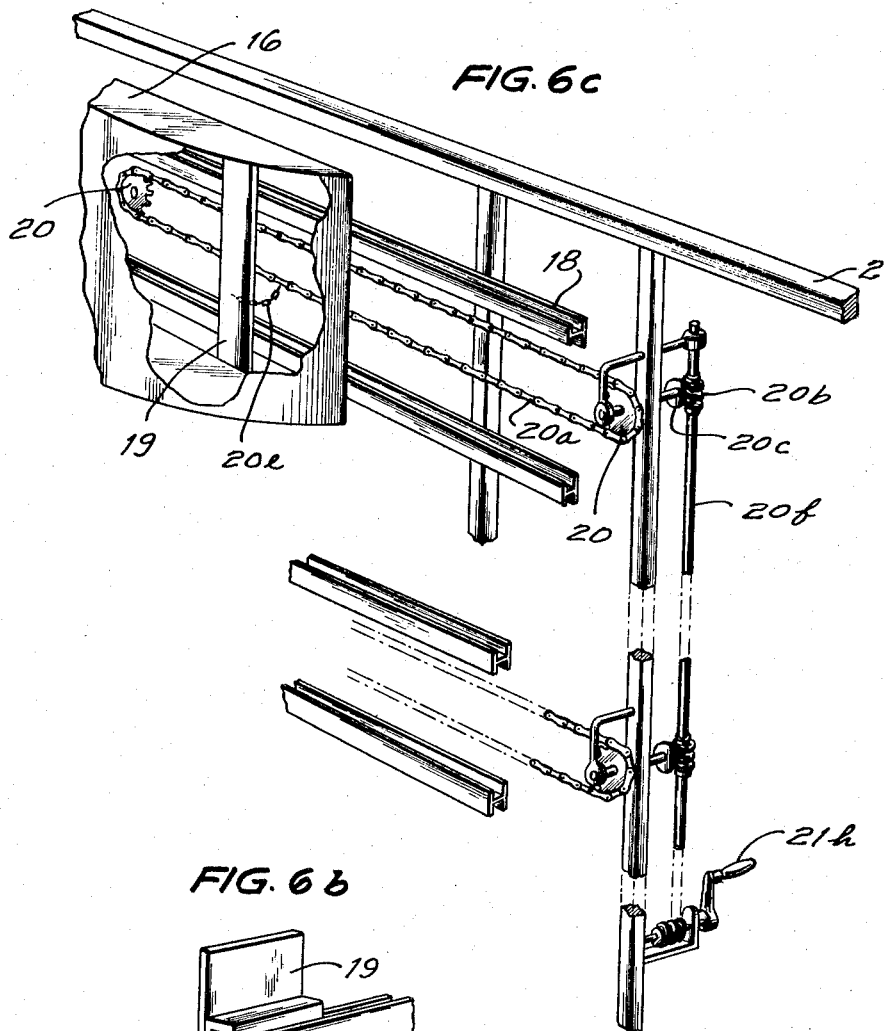
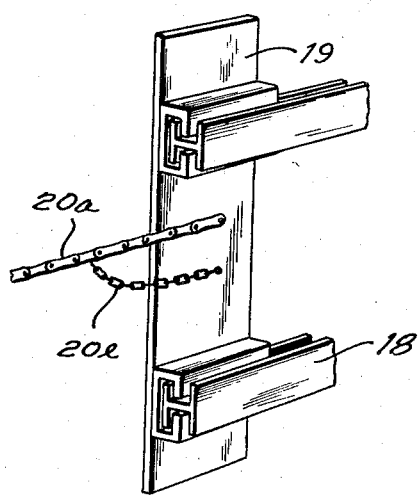
INVENTOR:
Fortunato Fernandez
de Oviedo
BY: Michael S. Striker
Agt.

United States Patent Office 2,812,823
Patented Nov. 12, 1957

2,812,823

WIND DRIVEN POWER PLANT WITH AIR GUIDING ELEMENTS

Fortunato Fernandez de Oviedo, Sevilla, Spain

Application June 21, 1952, Serial No. 294,792

Claims priority, application Spain June 23, 1951

2 Claims. (Cl. 170—17)

The present invention relates to wind driven power plant, and more particularly to a wind-driven power plant with stationary air guiding elements.

It is the object of the present invention to provide a wind-driven power plant in which air is guided to the rotary vanes by guiding elements.

It is another object of the present invention to provide a wind-driven power plant in which the desired angle between the driving air flow and the driven vanes is produced by guiding elements.

It is still another object of the present invention to provide a wind-driven power plant in which guiding elements guide the air to flow in such direction that pressure is caused on one side of the driven vanes and suction on the other side thereof.

It is a further object of the present invention to provide a wind-driven power plant in which the driven vanes need no adjustment and can, therefore, be made very large.

It is still a further object of the present invention to provide a wind-driven power plant in which the driven vanes rotate about a stationary vertical axis.

It is a yet further object of the present invention to provide a wind-driven power plant in which the driven vanes may be retracted so that the flow of air may act on a smaller surface.

It is also an object of the present invention to provide a wind-driven power plant which operates economically and reliably.

With these objects in view, the present invention mainly consists in a wind driven power plant, comprising in combination supporting means, an elongated vertically extending rotor including a supporting member mounted on the supporting means rotatably about a vertical axis and a plurality of equally spaced elongated vertically extending vanes mounted on the supporting member laterally projecting therefrom, and a plurality of equally spaced stationary vertically extending air guiding elements surrounding the rotor.

The guiding elements which guide the flow of air to the rotary vanes may also be utilized as supporting walls since they present a large vertical structure, or may be hollow and serve as storage tank for a liquid supplied by a pump driven by the wind driven power plant.

According to a preferred embodiment of the present invention, the driven vanes may be arranged on a polygonal tower which rotates about a vertical axis. The driven vanes may be mounted longitudinally slidably on the tower so that they may be retracted to offer a smaller surface to the flow of air.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 4 is a schematic plan view showing the mounting of a retractable driven vane;

Fig. 5 is a schematic front view of the arrangement shown in Fig. 4;

Fig. 6b is a schematic view of the mounting elements for the retractable driven vane; and Fig. 6c is a schematic elevational view of the drive mechanism for the retractable driven vane.

Figure 3:
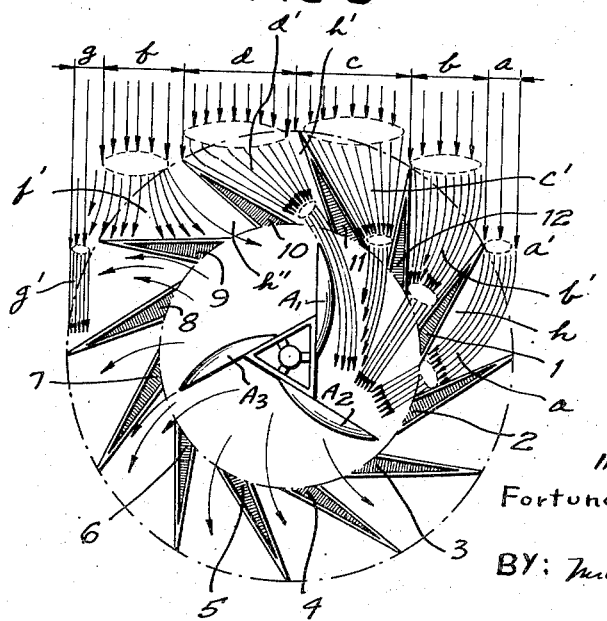
Fig. 3 is a diagrammatic plan view showing the flow of air through the guiding elements.

Referring now to the drawings, Fig. 3 shows the stationary air guiding elements 1 to 12 arranged around a rotor provided with vanes $A_1$, $A_2$, and $A_3$. In order to direct the flow of air in the most favorable manner, the guiding faces of the guiding elements must extend at a certain angle with respect to the rotary vanes.

In the event that the length of the guiding element exceeds the necessary minimum, as in the embodiment shown in Fig. 3, a larger portion of the cross-sectional area of the driving air flow is utilized.

Fig. 3 shows a rotor provided with three vanes $A_1$, $A_2$, and $A_3$ surrounded by twelve guiding elements 1–12. The flow of air is indicated by parallel arrows, and air passing through the cross-sectional area $a$ will enter between guiding elements 1 and 2. Air flowing through the cross-sectional area $b$ will enter between the guiding elements 1 and 12, and so forth.

The air flowing into the space between the guiding elements 1 and 2 will produce at the rear of the guiding element 1 and the dead zone $(h)$ so that the cross-sectional area of the flowing air will be substantially the same at $(a')$ as at $(a)$. The air entering between the guiding elements 1 and 12, however, will be compressed from the cross-sectional area $(b)$ to a cross-sectional area $(b')$, and its speed will be increased. The air entering into the cross-sectional area $(c)$ between the guiding elements 11 and 12 will be compressed to the cross-sectional area $(c')$. The air entering through the cross-sectional area $(d)$ will create a dead zone $(h')$ at the rear face of the guiding element 11, and will be compressed to the cross-sectional area $(d')$ and, passing the rear face of the vane $A_1$, will act on the front face of the vane $A_2$ together with the air entering through the cross-sectional areas $a$, $b$ and $c$.

Consequently, the cross-sectional area of the air flow utilized for any single vane is much larger than the surface of the front face of the vane, and so directed that the wind acts at a right angle to the front face of the active vane.

Air entering through the cross-sectional area $(f)$ will be partly deflected towards vane $A_1$, and partly deflected outwardly to compress the air entering through the cross-sectional area $(g)$. The air will pass the outer edges of the guiding elements 9 and 8 at a great velocity, and will create a negative pressure between these guiding elements thereby aiding the movement of the vanes $A_1$ and $A_3$.

The guiding elements may be adjustable, but it has been found advantageous to build the guiding elements of large power plants as concrete structures.

Figure 1:
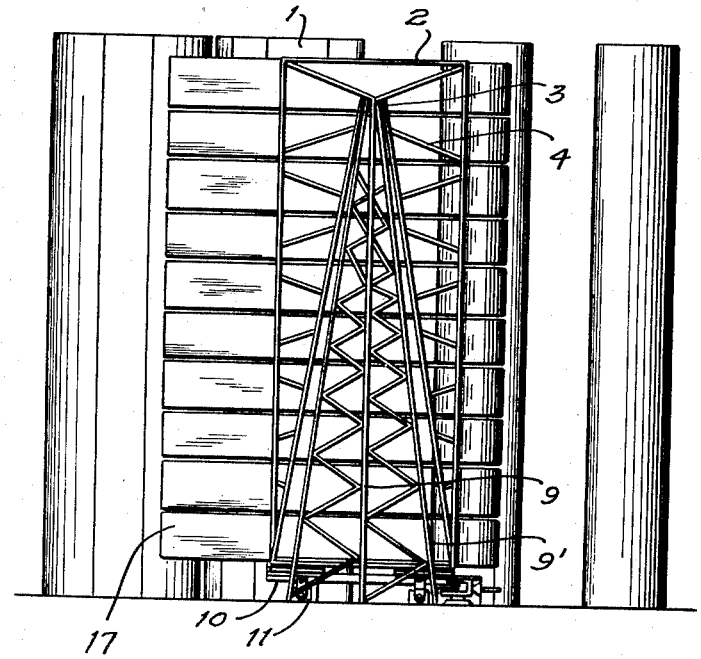
Fig. 1 is a front view of a wind-driven power plant according to a preferred embodiment of the present invention.
Figure 2:
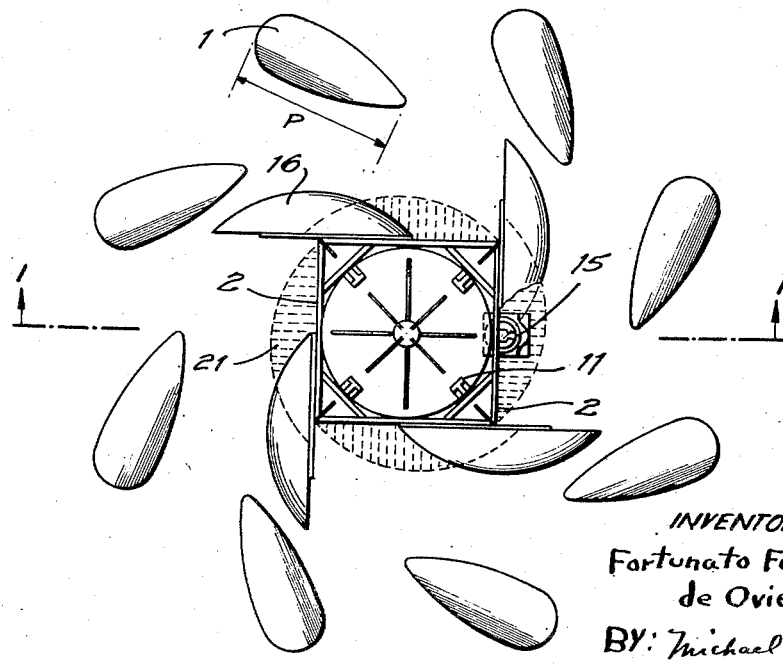
Fig. 2 is a schematic plan view of the embodiment shown in Fig. 1.

Figs. 1 and 2, show a wind-driven power plant according to the present invention provided with eight guiding elements 1 extending in the direction of the extended sides of a regular octagon inscribed in the circle passing through the innermost edges of the guiding elements 1. The guiding elements have a streamlined cross-section and a length P sufficient to prevent entering of air into the zone of the inactive rotor vanes.

The rotor comprises four vanes 16 mounted on a supporting member 2 having a square cross-section. The supporting member 2 is reinforced by an upwardly converging supporting structure 3. Connecting elements 4 connect this diverging supporting structure 3 with the supporting member 2. To the top of the supporting structure 3, a top member 5 is secured rotatably mounted on a supporting mast 9 by means of a vertical shaft 6 which is rotatably mounted in roller bearings 8.

The supporting mast 9 is secured to a supporting base and laterally supported by inclined supports 9'. A large annular member 10 is secured to the bottom of the supporting member 2 (see Fig. 1).

Fig. 1 shows a vane 16 composed of ten superimposed vane elements 17 mounted on the square support 2.

The vanes 16 may have any desired shape and structure but preferably are composed of a metal frame covered by aluminum sheets. The profile of the vanes may be of the usual streamlined shape, but a straight front face has been found advantageous. The rear face is preferably shaped as a portion of a cylindrical surface. In view of the fact that the wind energy may exceed an amount which can be utilized, it has been found advantageous to provide means to reduce the amount of energy derived from the flow of air, such as to reduce the active surface of the vanes by retracting the same. Therefore, the vane elements 16 may be slidably and retractably mounted on the support 2, as shown in greater detail in Figs. 4 and 5. Chains 20a moved by wheels 20, Figs. 5 and 6, may retract the vane elements into the position shown as a shaded area 21 in Fig. 2, so that the rotor may assume an almost cylindrical shape, whereby only a small fraction of the wind energy is utilized, or a cylindrical shape in which it does not turn.

Figure 6A:
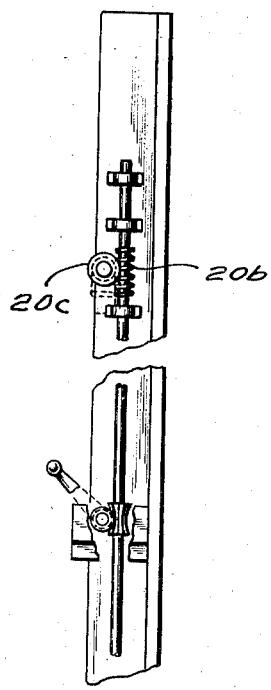
Fig. 6a is a side view of the detail shown in Fig. 6.
Figure 6:
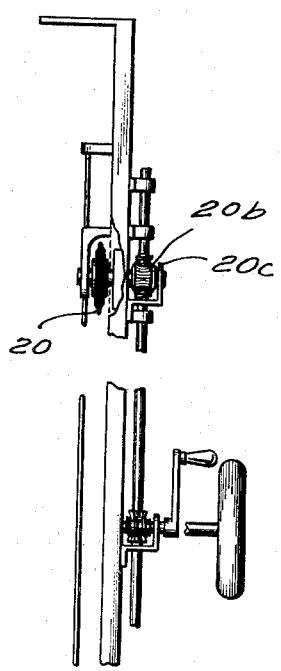
Fig. 6 is a plan view of a detail of the arrangement shown in Fig. 4.

Figs. 6 and 6a show the retracting arrangement in greater detail. The arrangement may be driven by servomotors or manually and includes a worm spindle 20b and a worm wheel 20c acting on chain wheel 20.

Support 2 has affixed thereon in spaced relationship a plurality of horizontal pairs of rails 18, the number of pairs of rails being equal to the number of vane elements. The contour of the rails 18 can be best seen in the detailed Fig. 6b. Each vane element is provided with a plurality of slide elements 19 welded thereto and adapted to be positioned at right angles to the rails 18 and to cooperate and engage therewith (see Figs. 6b and 6c) so that the vane elements are slidably mounted on the support 2. As discussed above, endless chains 20a (see Fig. 4) are adapted to be moved by wheels 20 which in turn are actuated through worm spindle 20b and worm wheel 20c which are hand or motor driven. The crank 21h, indicated schematically in Fig. 6c, is positioned inside the structure 2 at the bottom thereof so as to be easily accessible to an operator. Upon turning of the crank, shaft 20f is turned and through the medium of the elements 20b and 20c, the chain wheels 20 are rotated, about which wheels endless chains are arranged respectively. It is to be noted that a separate chain is provided, at respective levels for each of the vane elements. Thus, when the crank handle 21h is turned, a whole series of vertically aligned wheels 20 are caused to turn, each wheel 20 being the drive for a separate vane element.

As can be seen in Fig. 5, a pair of wheels 20 are rotatably mounted on the support structure and horizontally displaced from one another, so as to support an endless chain 20a, the latter being positioned between each pair of rails and also between the supporting structure and the metallic inner surface of each vane element. The positioning of the chains can be clearly seen in Fig. 6c. A short secondary chain (see Figs. 6b and 6c) 20e is connected between each endless chain 20a and one of the slide elements 19 on each vane element. Upon rotation of the endless chains, the vane elements are then slid inwardly or outwardly on the supporting structure 2. It is to be further noted that the crank mechanism for turning the chains is simply connected to a longitudinal beam on the rotatable structure 2, the crank being accessible to the operator when the structure 2 is not in rotation.

It will be understood that each of the elements described above, or two or more together, may also find a useful application in other types of wind-driven power plants differing from the types described above.

While the invention has been illustrated and described as a wind-driven power plant with guiding elements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a wind-driven power plant, in combination, supporting means; an elongated vertically extending rotor including a prismatic supporting member mounted on said supporting means rotatable about a vertical axis, and having rectangular lateral faces, said rotor including a plurality of elongated vertically extending vanes, each vane having a segment-shaped cross-section, and being bounded by a rectangular face having the same dimensions as said rectangular faces of said supporting member, and an arcuate face which is a portion of a cylindrical surface, said vanes being mounted on said supporting member movable between an inoperative position in which each vane is located with the rectangular face thereof on a rectangular face of said supporting member so that said arcuate faces form together a cylindrical surface, and an operative position projecting from said supporting member; and a plurality of stationary vertically extending air guiding elements surrounding said rotor, and adapted to guide flowing air towards the same, said rotor being only rotated when said vanes are in said operative position.

2. In a wind-driven power plant, in combination, supporting means; an elongated vertically extending rotor including a prismatic supporting member mounted on said supporting means rotatable about a vertical axis, and having a square cross-section and rectangular lateral faces, said rotor including four elongated vertically extending vanes, each vane having a segment-shaped cross-section, and being bounded by a rectangular face having the same dimensions as said rectangular faces of said supporting member, and an arcuate face which is a portion of a cylindrical surface whose diameter is equal to the diameter of said square cross-section, said vanes being mounted on said supporting member movable between an inoperative position in which each vane is located with the rectangular face thereof on a rectangular face of said supporting member so that said arcuate faces form together a cylindrical surface, and an operative position projecting from said supporting member; and a plurality of stationary vertically extending air guiding elements surrounding said rotor, and adapted to guide flowing air towards the same, said rotor being only rotated when said vanes are in said operative position.

(References on following page)

References Cited in the file of this patent

UNITED STATES PATENTS

| | | |
|---|---|---|
| 230,614 | Cook | Aug. 3, 1880 |
| 544,654 | Bowen | Aug. 20, 1895 |
| 1,712,149 | Kolozsy | May 7, 1929 |
| 1,764,052 | Pfeifer | June 17, 1930 |

FOREIGN PATENTS

| | | |
|---|---|---|
| 24,581 | France | Sept. 16, 1922 |
| | (1st add. to 524,308) | |
| 97,495 | Switzerland | Jan. 16, 1923 |
| 282,900 | Italy | Feb. 25, 1931 |
| 406,661 | Italy | Dec. 6, 1943 |
| 550,046 | France | Feb. 24, 1923 |
| 610,213 | France | Sept. 1, 1926 |
| 729,533 | Germany | Dec. 18, 1942 |
| 946,640 | France | June 9, 1949 |